(12) United States Patent
Hermann et al.

(10) Patent No.: US 8,399,167 B2
(45) Date of Patent: Mar. 19, 2013

(54) TONER COMPOSITION, DEVELOPER COMPRISING THE TONER COMPOSITION, AND METHOD IN CONNECTION WITH THE PRODUCTION OF A VOLUME BODY

(75) Inventors: David Hermann, Göteborg (SE); Ralf Larson, Mölnlycke (SE)

(73) Assignee: Sintermask GmbH, Lupburg (DE)

( * ) Notice: Subject to any disclaimer, the term of this patent is extended or adjusted under 35 U.S.C. 154(b) by 407 days.

(21) Appl. No.: 12/675,098

(22) PCT Filed: Aug. 27, 2008

(86) PCT No.: PCT/EP2008/007019
§ 371 (c)(1),
(2), (4) Date: Feb. 24, 2010

(87) PCT Pub. No.: WO2009/027079
PCT Pub. Date: Mar. 5, 2009

(65) Prior Publication Data
US 2011/0117485 A1 May 19, 2011

(30) Foreign Application Priority Data
Aug. 27, 2007 (SE) .................................. 0701934-2

(51) Int. Cl.
*G03G 9/09* (2006.01)
(52) U.S. Cl. ............. 430/108.7; 430/108.24; 430/108.1; 430/110.2; 430/106.2
(58) Field of Classification Search ............... 430/48, 430/108.24, 108.1, 110.2, 106.2
See application file for complete search history.

(56) References Cited

U.S. PATENT DOCUMENTS

| 6,040,094 | A | 3/2000 | Otsuka et al. | |
|---|---|---|---|---|
| 6,531,086 | B1 | 3/2003 | Larsson | |
| 2001/0005568 | A1* | 6/2001 | Sokol et al. | 430/108.24 |
| 2007/0037082 | A1* | 2/2007 | Goto et al. | 430/108.1 |
| 2007/0196755 | A1* | 8/2007 | Mang et al. | 430/106.2 |
| 2008/0003515 | A1* | 1/2008 | Shin et al. | 430/110.2 |
| 2008/0096116 | A1* | 4/2008 | Utsumi et al. | 430/48 |

FOREIGN PATENT DOCUMENTS

| DE | 199 42 054 A1 | 12/2001 |
|---|---|---|
| WO | 98/51464 A1 | 11/1998 |

OTHER PUBLICATIONS

International Search Report for PCT/EP2008/007019.
Written Opinion for PCT/EP2008/007019.

* cited by examiner

*Primary Examiner* — Mark F Huff
*Assistant Examiner* — Rashid Alam
(74) *Attorney, Agent, or Firm* — J-TEK Law PLLC; Jeffrey D. Tekanic

(57) ABSTRACT

The present invention relates to a toner composition for forming a masking pattern for use e.g. in connection with a method of building up a three-dimensional body from a large number of mutually connected layers of powder particles that are bonded to each other using radiant heat. The toner composition consists of powder particles that are able to withstand a temperature of at least 200° C. without sticking together. It also relates to a developer that comprises the toner composition and carrier particles and a method in connection with the production of a volume body by using a toner composition or a developer according to the invention.

24 Claims, No Drawings

TONER COMPOSITION, DEVELOPER COMPRISING THE TONER COMPOSITION, AND METHOD IN CONNECTION WITH THE PRODUCTION OF A VOLUME BODY

CROSS-REFERENCE

The present application is the U.S. national stage of International application no. PCT/EP2008/007019 filed Aug. 27, 2008, which claims priority to Swedish patent application No. 0701934-2, filed 27 Aug. 2007, and U.S. patent application No. 60/968,118, filed 27 Aug. 2007, both of which are incorporated herein by reference as if fully set forth herein.

TECHNICAL FIELD

The present invention relates to a toner composition adapted to be used for forming a masking pattern in a method of building up a three-dimensional body from a large number of mutually connected layers of powder particles that are bonded to each other using radiant heat.

The invention also relates to a developer for use in a system for two-component development, which comprises said toner composition.

Furthermore, the invention relates to a method for manufacturing a volume body formed by a large number of mutually connected layers of powder particles that are bonded to each other by radiant heat, wherein a masking pattern formed by a toner composition prevents the radiation from sintering or melting together certain surface areas of an uppermost layer of the powder particles.

TECHNICAL BACKGROUND

A toner composition consists of toner particles and any additives carried by the toner particles, in order for example to improve the properties of the toner particles. Usually, the additives are present in the form of particles that are small compared to the toner particles.

In this context, the term "developer" means a powder that comprises a mixture of toner particles and carrier particles. The carrier particles are large compared to the toner particles and carry the same. During development, the toner particles are applied onto a device, preferably a printer drum, the surface of which has electrically highly charged regions and electrically un- or low-charged regions. The toner particles adhere to one of the regions and the thus "developed" image is transferred to a clear glass plate. A masking pattern is formed thereon in order to mask a corresponding region of a layer of build powder particles that are to bond to each other by radiation passing through the mask. The build powder particles that have been exposed to radiation are bonded to each other by e.g. sintering or melting together. When the volume body has been built up, the build powder particles that have not been exposed to radiation are removed and are optionally reused.

It is known to produce prototypes from originals in the form of layered CAD drawings, wherein the information from each layer is used to sinter together or melt material, then allowed to solidify into a three-dimensional body. In case a computer controlled laser beam is used to selectively sinter/melt the material, expensive machines are required and the building up of a normal size prototype is time-consuming. For some applications, it has been possible to increase the speed by using an UV radiator that illuminates the entire surface simultaneously through a masking pattern of toner on a glass plate, but such machines are also expensive to acquire.

EP 1,015,214, which corresponds to U.S. Pat. No. 6,531,086, discloses a method and a device for the production of volume bodies from a large number of mutually connected layers of a particulate material, such as a powder, wherein the information concerning the appearance of each layer is obtained from the CAD unit or the like of a computer. The described method and device enable the formation of a three-dimensional body, based on originals in the form of layered CAD drawings, wherein the information from each layer is used to sinter or melt together powder material. In particular, said method comprises applying an essentially even layer of particles on a substrate, placing a masking pattern according to information from the CAD unit on a masking device that is brought over and close to the particle layer, and placing or passing a radiator, preferably an IR radiator, over the masking device, whereby particles that are not covered by the masking pattern are exposed to radiation and are thereby bonded together. Thereafter, the masking pattern is removed from the masking device and new steps according to the above, with reuse of the toner powder, are performed until the volume body has been produced. A device for performing this method is cheaper than the above described devices. Furthermore, the production of a layer will be very fast, as the entire surface or a large part of the surface can be irradiated simultaneously. The masking device comprises e.g. a transparent quartz plate, on which for example a printer head has deposited a masking pattern of a suitable toner that does not adhere onto the quartz plate when melting.

As an example of a suitable toner powder that does not melt bond, aluminum oxide is suggested, which has a high melting point and a high degree of reflection. However, it has been shown that aluminum oxide degrades the equipment and that its colour, white to ivory, does not give a desired high reflection. Direct (i.e. specular) reflection does not occur from aluminum oxide and diffuse reflection inside the powder layer is low. Accordingly, the radiation does not spread within the toner layer in order to give it a better chance of hitting absorbing sites. Hence, the use of aluminum oxide as a toner will result in the risk of emergence of areas of higher temperature in the mask, i.e. so called "hot spots".

For radiation incident on a masking pattern that partly passes to the powder particles, from which the volume body is to be built, the following equation applies: transmission+reflection+absorption=100%. The toner of the masking pattern performs its optical function in powder form, as opposed to a "regular" toner that is melted onto its substrate. Thereby, the powdered toner layer acts as an optical diffuser, which means that the portion of the total incident electromagnetic radiation that is not absorbed will be transmitted and reflected in several directions. In other words, the total transmission consists of direct transmission as well as diffuse transmission, just as the total reflection consists of direct reflection and diffuse reflection. Since the aluminum oxide of the known method has a particularly bright colour, a relatively large portion of the radiation will be reflected both directly and diffusely, while a relatively low portion will be absorbed.

The effective transmission is of interest for the masking action of the toner layer, as it corresponds to the exposure, to which a masked point on the build powder surface is subjected when the build powder grains that are to be melted together are directly irradiated in order to build up the volume body. This value includes directly and diffusely transmitted light. The radiation that does not penetrate the mask has either been absorbed or reflected. The largest part of the reflected radiation is diffusely reflected and should be stopped from reaching the build powder and thus adversely affecting it such that the powder grains, which were intended to be protected by the mask, stick together to form aggregates that result in problems in connection with the continued building up of the volume body.

The present invention is directed, at least in part, to improving or overcoming one or more aspects of prior toner compositions for forming a masking pattern adapted to be used in a method of building up a three-dimensional body from a large number of mutually connected layers of powder particles that are bonded to each other using radiant heat.

SUMMARY OF THE INVENTION

According to a first aspect of the present teachings a toner composition is provided which comprises toner particles that are able to withstand a temperature of at least 200° C. without sticking together. The toner particles may essentially consist of a polymer material, a non-abrasive ceramic material or a non-abrasive metal material. According to the present invention, a non-abrasive ceramic or metal material has a Mohs-hardness of 8 or less. The toner particles, without additives or optionally with additives on the surface and/or in the interior thereof, absorb and reflect incident electromagnetic radiation that impinges essentially perpendicularly onto the masking pattern such that a toner layer having a thickness that corresponds to three particle mono-layers of powder particles will result in a radiation transmission of not more than 30%. Optionally, the toner particles are provided with an abrasion-reducing coating that is heat resistant, at least at the operating temperature of the toner particles, and that is softer than the toner particles as such.

Preferably, the toner particles have a spherical shape.

A reusable toner composition is also provided that can be easily recirculated in a system for layered building up of a three-dimensional body and without appreciable wear on the equipment.

The present toner composition does not melt bond to the glass plate and has considerably reduced abrasion properties as well as a decreased reflection, such that a high temperature resistant, reusable toner composition is provided.

Due to the difficulty in producing a toner composition in which all toner particles have the same diameter, their average diameter is used as the basis for the thickness of a particle mono-layer, i.e. a layer of equally sized particles that contact each other only laterally. In the present description and claims, the term "average diameter" refers to the volumetric average diameter, i.e. the volumetric d50. In the present context, a toner layer having a thickness corresponding to three particle mono-layers has a thickness of three times the average diameter of the toner particles. In the case of spherical, equally-sized particles with hexagonal close-packing, the theoretical height of a layer of three particle mono-layers will be about 91% of three times the particle diameter.

By providing the toner particles with an additive comprising absorbing pigments, it is e.g. possible to decrease the transmission to about between half and a third of the transmission that is achieved by toner particles without any absorbing pigment. The absorbing pigments will, to some extent, also reduce reflection.

Preferably, the temperature resistance of the toner particles is due to a high glass transition temperature and the material of the toner particles is chosen such that the toner particles will withstand mechanical deformation at the intended temperature of use, for example as they are scraped off from a glass plate on which the masking pattern has formed. The glass transition temperature of a polymer material for the toner particles should be as high as possible, i.e. higher than or at least about the same magnitude as the temperatures that the toner normally is exposed to during the 3D-build process. This means that the glass transition temperature should be more than 200° C. and preferably up to about 280° C. Above the glass transition temperature the particles become soft and deformable and hence there is also a risk that they will become sticky, i.e. the higher the glass transition temperature of the toner is, the less susceptible it will be to sticking together. Since the toner is scraped off from the glass plate just a short time after the IR exposure, it is still relatively hot. If the temperature of the toner is at or above the glass transition temperature at the time of scraping, there is a risk that the scraping will cause a deformation and sticking together of the particles. Likewise, when the toner is remixed with carrier in the recirculation system, mechanical pressure on the toner from the carrier particles is also a possible cause of deformation of toner particles.

The toner particles are preferably selected such that a toner layer having a thickness of three particle mono-layers will result in a radiation transmission of not more than 30%, preferably 1-20%, more preferably not more than 5%. In this case, it will be easy to protect the build powder particles that are not allowed to stick together to form aggregates even when using strong radiation pulses, thereby making it possible to reduce the cycle time for the layer-by-layer building up of the volume body.

In case the toner particles comprise a polymer material, the polymer material is advantageously chosen from a group that consists of fluoropolymers, such as polytetrafluoroethylene (PTFE) and perfluoroalkoxy polymer (PFA), or from a group of other high-temperature polymers, such as polyimide (PI), polyethersulfone (PES) and polyetheretherketone (PEEK). Particles of the materials of this group will cause less wear than particles of metal materials and ceramics. PFA 340 from E.I. DuPont de Nemours and Company, e.g., has a highest operating temperature of 260° C. for continuous use and a highest operating temperature of 290° C. for intermittent use.

In case the toner particles comprise a non-abrasive ceramic material, the non-abrasive ceramic material is advantageously chosen from a glass, such as for example fused silica, and talcum powder.

In case the toner particles comprise a non-abrasive metal material, the non-abrasive metal material is advantageously chosen from gold or gold alloys, titanium or titanium alloys and stainless steel.

It is also suitable for the toner particles to consist of a polymer that is mixed with and that internally and/or externally carries one absorbing and one reflecting material and, if desired, charge control additives, i.e. so called "Charge Control Agents" (CCA), and additives that change the flow properties of the toner. The flow properties are of importance when the toner or the developer is to brought into the development zone of the development sub-system, such that there is always a sufficient amount of toner available for development at the time of development. The toner and the developer should also be able to flow well during handling, such that the toner and developer can be efficiently fed back into the recirculation system and such that the toner or developer can be efficiently fed from the recirculation system back into the development sub-system. Furthermore, good flow properties will also result in that the toner or developer does not become compacted within any part of the system, which would cause clogging.

Said additives can be constituted by additives that are used for a toner in ordinary copying machines; carbon black is e.g. excellent in improving the absorption of the toner particles. By adding absorbing pigments, such as carbon black, preferably at a content of 0.5-5% (given in weight percent) to the toner, a considerable part of the radiation will be absorbed. As an example of a suitably reflecting additive, titanium dioxide is suggested, the reflecting action of which is associated with its high refractive index (about 2.7), which suitably can be added at an amount of between 4-10% (given in weight percent). As an example of a suitable additive that improves flowability, silicon dioxide is suggested, which optionally can be added in an amount of between 0.1-1%.

The toner particles may have an average diameter d50 of about 30-35 μm with a relatively large particle size distribution, which is satisfactory for many purposes. Advantageously however, a major part, i.e. 50% or more, of the toner particles has a diameter of between 4 μm and 20 μm, preferably an average diameter of about 12 μm. Since finer grains will give an improved resolution of the image, i.e. finer details can be reproduced in the masking pattern, it is advantageous that the upper limit is about 20 μm. If the lower limit is decreased below about 4 μm, the flow properties will be considerably impaired, as will the miscibility with carrier particles in a developer for use in a system for two-component development. In a system for mono-component development, the toner composition according to the invention is used without being mixed with carrier particles.

A developer is also provided for use in a system for two-component development and comprises a toner composition, wherein the toner composition does not melt bond to the glass plate, its abrasion on the equipment is considerably diminished and its reflection is decreased, such that a high temperature resistant, reusable toner composition is achieved.

Such a two-component developer preferably comprises a mixture of carrier particles and the above-described toner composition comprising toner particles.

In such a developer, the carrier particles are preferably heavy ferrite particles that are magnetically susceptible and have a diameter that is 2-10 times larger than the diameter of the toner particles. Preferably, the toner concentration in the range of 5-30% is given as the toner weight divided by the total weight of the toner-carrier mixture, which corresponds to the range of 5-43% given as the toner weight divided by the carrier weight only. Preferably, the toner concentration is 20-25%, given as the toner weight divided by the total weight of the toner-carrier mixture, which corresponds to 25-33% given as the toner weight divided by the carrier weight only. Optionally, the carrier particles are provided with a charge adjusting coating that is heat resistant, at least at the operating temperature of the carrier particles, and that in addition also could be abrasion reducing by virtue of being softer than the carrier particles as such.

Further, the developer comprising a mixture of the above described toner composition and carrier particles can be also used in a process that includes a step of two-component development in combination with one or more steps of mono-component development.

A method in connection with the production of a volume body of a large number of mutually connected layers of powder particles that are bonded to each other by radiant heat is also provided, wherein a masking pattern formed by a toner composition prevents the radiation from sintering or melting together certain surface areas of an uppermost layer of the particulate material. In this method, the toner composition does not melt bond on the glass plate and its abrasion on the equipment and its reflection are decreased, such that a high temperature resistant, reusable toner composition is obtained.

This method is preferably performed by using the above described toner composition or the above described developer, wherein at least 50% of the toner composition or the developer are recirculated.

DETAILED DESCRIPTION OF PREFERRED EMBODIMENTS

The toner composition according to the present teachings is primarily used in connection with the production of prototypes from originals in the form of layered CAD drawings, wherein the information for each layer is used to sinter or melt together powder of a build material and the powder is allowed to solidify to form a three-dimensional body. For the production of a volume body of a large number of mutually connected layers of powder particles that are bonded to each other using radiant heat, a masking pattern formed by a toner composition is used, which prevents the radiation from sintering or melting together certain surface areas of an uppermost layer of the particulate build material.

When a thin layer of the particulate build material has been spread out on an appropriate substrate, a clear glass plate that carries a mask formed by the toner composition is disposed at a distance above the layer of build powder. A device that emits radiant heat is switched on and melts/sinters together the unmasked parts of the layer of build powder. The glass plate with the mask is then removed and scraped clean so that the next mask can be applied thereto, whereafter the procedure is repeated. If desired, the glass plate can consist of silicon dioxide, i.e. the glass is composed of quartz glass, and it may be provided with an electrically conducting transparent layer. In principle, the powder particles of the toner composition are recirculated and need not be replaced unless their physical properties have been changed, like for example in case the particles have become larger or smaller than desired and/or have changed in shape due to abrasion.

Techniques known from copying machines that utilise toner are used in order to apply the mask on the glass plate. An electrostatic pattern with areas of high negative charge in accordance with the CAD information can for example be charged on the glass plate or on a printer drum that electrostatically transfers the toner to the glass plate. Negatively-charged toner can be applied and attached to un- or low-charged portions while the toner does not adhere to highly negatively charged portions that accordingly will remain uncoated. Of course, the reversed polarity can be used if desired.

In contrast to the toner compositions that are ordinarily used in copying machines, in which the toner is to be melt bonded to a substrate, usually paper, the present toner composition comprises toner particles that are able to withstand a temperature of at least 200° C. without sticking together and that essentially consist of a polymer, ceramic or metal material, as described above, and that if needed include, at the surface and/or in the interior thereof, additives that absorb and reflect electromagnetic radiation that strikes the masking pattern essentially perpendicularly, such that a toner layer having a thickness that corresponds to three particle mono-layers of toner particles will result in a radiation transmission of not more than 30%. For this purpose, a reusable toner composition is provided that can be easily recirculated in a system for layered building up of a three-dimensional body and without appreciable wear on the equipment.

In general, transmission+reflectance+absorption=100%. The present toner composition performs its optical function in powder form, as opposed to toner used in copying machines that is melt bonded to its substrate. Preferably, a layer produced from the toner composition acts as an optical diffuser, which means that the not-absorbed portion of the total incoming electromagnetic radiation will be transmitted and reflected in several directions. In other words, the total transmission consists of direct transmission as well as diffuse transmission, just as the total reflection consists of direct reflection and diffuse reflection. If an absorbing pigment is also included in the present toner composition, a significant amount of the light is absorbed.

In order to measure transmission, the amount of light at a point that is located a small distance from (i.e. behind or below) the mask is measured. This means that an effective transmission, which corresponds to the exposure of a point on the surface of the build powder, is measured. This value is made up of direct and diffusely transmitted light. The light that does not penetrate the mask has either been absorbed or reflected. The largest part of the reflected light is diffusely reflected.

By this measurement method, the relevant values are the ones given above in order to perform the process of building up a three-dimensional body, like for example a prototype, by sintering/melting together the powder. A transmission of 20% means that 80% of the light has been absorbed and reflected (and also comprises a small amount of diffusely transmitted light that has not been recorded in the measurement). It cannot be directly deduced from the transmission measurement value how much of the light is absorbed and how much of the light is reflected, but for comparison it can be stated that transmission for the same toner, but without addition of the absorbing pigment, will give a measurement value of about 60%. In other words, addition of the absorbing pigment means that the amount of energy that a point on the build surface is exposed to will be decreased to at least 20%/60%=⅓ (one third). A value of 5% transmission means that the absorbing pigment decreases the transmitted energy to less than a tenth, as compared with a toner that lacks absorbing pigment.

If the absorbing pigment is not added, the reflection is about 40% (100%-60% transmission—0% absorption). If the absorbing pigment is added, the amount of reflected energy will also decrease. Assuming that this amount is also decreased by ⅓, the reflected light will be 40%/3≈13%. Thereby, 67% of the energy will be absorbed (20%+13%+67%=100%).

The required thickness of the toner composition layer depends on the size of the toner particles. 2-3 layers of toner particles are usable, which in this case corresponds to about 70-100 μm, corresponding to a transmission of about 20-25%. The relation between transmission and thickness of the toner layer depends on the type of toner material and the amount of added pigment.

The measured transmission is related to the amount of toner per unit area and to the thickness of the toner layer in the following manner: The optical density is proportional to toner mass per unit area; the optical density is proportional also to the thickness of the toner layer. The optical density is given by the logarithm of the transmission.

Due to the difficulty in producing a toner in which all toner particles have the same diameter, their average diameter d50 is used as the basis for the thickness of a particle mono-layer, i.e. a layer of equally-sized particles that contact each other only laterally.

In the present context, a toner layer having a thickness corresponding to three particle mono-layers has a thickness of three times the average diameter of the toner particles. In the case of spherical, equally sized particles with hexagonal close-packing, the theoretical height of a layer of three particle mono-layers will be about 91% of three times the particle diameter.

Preferably, the heat resistance of the toner particles is due to a high glass transition temperature and the material of the toner particles is chosen such that the toner particles will withstand mechanical deformation at the intended temperature of use, for example as they are scraped off from a glass plate on which the masking pattern has formed. The glass transition temperature of the polymer material should be as high as possible, i.e. higher than or at least about the same magnitude as the temperatures that the toner normally is exposed to during the 3D-build process. This means that the glass transition temperature should be more than 200° C. and preferably up to about 280° C. Above the glass transition temperature the particles become soft and deformable and hence there is also a risk that they will become sticky, i.e. the higher the glass transition temperature of the toner is, the less susceptible it is to sticking together. Since the toner is scraped off from the glass plate just a short time after the IR exposure, it is still relatively hot. If the temperature of the toner is at or above the glass transition temperature at the time of scraping, there is a risk that the scraping will cause a deformation and sticking together of the particles. The glass transition temperature of the material depends on how the heat energy is added to the material, but in certain cases it can be no more than about 90° C. Such a toner composition can be used in practice, but not for any longer time period. If a developer that comprises toner particles having a low glass transition temperature is used for a very long time (=2000-12000 prints), small toner particles may agglomerate to form larger toner particles that may assume a more flake-like shape instead of a particle shape.

Moreover, the toner particles are selected such that a toner layer of said thickness (the theoretical height of a layer of three particle mono-layers, i.e. about 91% of three times the particle diameter) will result in a radiation transmission of not more than 30%, preferably 1-20%, more preferably not more than 5%. In this case, it will be easy to protect the build powder particles that are not allowed to stick together to form aggregates even when using strong radiation pulses, thereby making it possible to reduce the cycle time for the layer-by-layer building up of the volume body.

As mentioned above, the polymer material for the toner particles is advantageously chosen from a group that consists of fluoropolymers, such as polytetrafluoroethylene (PTFE) and perfluoroalkoxy polymer (PFA), or from a group of other high-temperature polymers, such as polyimide (PI), polyethersulfone (PES) and polyetheretherketone (PEEK). Particles of the materials of this group will cause less wear than particles of metal materials and ceramics. Moreover, fluoropolymers are a preferred material in respect of avoiding sticking together.

It is also suitable for the toner particles to consist of polymer particles that internally and/or externally carry one absorbing and one reflecting material and, if desired, charge control additives, i.e. so called "Charge Control Agents" (CCA), and additives that change the flow properties of the toner. In the present context, the word "carry" means that said additive materials and additives can be adhered, e.g. electrostatically, to the surface of the toner particle ("external additives"), for example by a dry mixing process, or that they can be embedded in the toner particle ("internal additives") by a process that inter alia may comprise e.g. melting together the additive and the toner material during the process of producing the toner composition. For embedding, the starting materials can be mixed with each other, melted and extruded and then ground in one or more steps and optionally be size-classified. Adhering and embedding can also take place when the toner particles mainly consist of ceramic or metal material. The reflecting material will increase the mean path length in the mask and will thereby spread the heating of the mask caused by the absorption. The flow properties of the toner particles are also of importance, as described above.

The flow properties can be measured e.g. by pouring toner in the form of a pile on an even surface and then measuring the angle of repose, i.e. the angle between the edge of the pile and the base, or by measuring the smallest circular aperture in the bottom of a cylinder, through which a powder at rest spontaneously starts to flow when the aperture is opened/uncovered ("Flowability Index", "Critical Orifice Diameter").

Said additives can be constituted by additives that are used for toner in ordinary copying machines; carbon black is e.g. excellent in improving the absorption of the toner particles. By the addition to the toner of absorbing pigments, such as carbon black, suitably at a content of 0.5-5% (given in weight percent), a considerable part of the radiation will be absorbed. As an example of a suitably reflecting additive, titanium dioxide is suggested, the reflecting action of which is associated with its high refractive index (about 2.7), which suitably can be added at an amount of between 4-10% (given in weight percent). The titanium dioxide will help in evenly spreading the light within the toner layer, such that homogeneous absorption takes place, whereby "hot spots" (i.e. a very high local absorption) are avoided in the toner layer. In addition, it will still reflect a portion of the light from the toner layer as such. As an example of a suitable additive that improves flowability, silicon dioxide is suggested that if needed can be added at an amount of between 0.1-1% by weight.

The toner particles may have an average diameter d50 of about 30-35 µm with a relatively large particle size distribution, which is satisfactory for many purposes. Advantageously however, a major part of the toner particles has a diameter of between 4 µm and 20 µm, preferably an average diameter of about 12 µm. Since finer grains will give an improved resolution of the image, i.e. finer details can be reproduced in the masking pattern, it is advantageous that the upper limit is about 20 µm. If the lower limit is reduced below about 4 µm, the flow properties will be considerably impaired, as will the miscibility with carrier particles in a developer for use in a system for two-component development. In a system for mono-component development, the present toner composition is used without being mixed with carrier particles. The carrier is chosen or designed in respect of a suitable level of charge for the toner composition.

In a preferred embodiment of the developer, the carrier particles are preferably heavy ferrite particles that are magnetically susceptible and have a diameter that is 2-10 times larger than the diameter of the toner particles. The density of the ferrite particles is 2-3 times higher than the density of the toner particles. This means that when carrier and toner are mixed and remixed, the carrier particles will counteract the tendency of each of the toner particles to form agglomerates—in that way the (re)mixing will in some way be a type of inherent grinding process. Preferably, the toner concentration in the range of 5-30% is given as the toner weight divided by the total weight of the toner-carrier mixture, which corresponds to the range of 5-43% given as the toner weight divided by the carrier weight only. Preferably, the toner concentration is 20-25%, given as the toner weight divided by the total weight of the toner-carrier mixture, which corresponds to 25-33% given as the toner weight divided by the carrier weight only.

The following steps are conducted when the developer comprising the toner composition is used in a preferred device for the production of prototypes from originals in the form of layered CAD drawings, wherein the information for each layer is used to sinter or melt together powder of a build material and is allowed to solidify to form a three-dimensional body. The developer is mixed and transported to a magnetic roll. The mixture should be homogeneous, such that the carrier that is magnetic and thereby adheres to a magnetic roll can carry the toner that is electrostatically transferred to a donor roll. In this step, the carrier and toner separate. The carrier stays in the developer subsystem and is never fed to the donor roll. The carrier circulates inside and is reused continuously. From the donor roll that is completely covered with toner, the toner is transferred to a printer drum, whose surface has a latent (invisible) pattern of two different types of areas, wherein one type of area has a high negative electrostatic charge, while the other type of area has either a low electrostatic charge of negative polarity or a zero electrostatic charge. Toner develops (makes visible) the latent pattern or image, because the electrostatically low- or non-charged areas do not significantly repel toner, while the electrostatically high-charged areas repel toner. These areas remain free from toner and in that way a negative of the object to be formed is created. The toner particles are negatively charged and hence they are repelled from the negatively highly charged areas on the drum, while toner is deposited on the electrostatically low- or non-charged areas on the drum that have an electrostatic potential, which is either small and non-zero, or which may be zero. The toner particles deposit on low- or non-charged areas, because a high voltage, consisting of a direct current as well as an alternating current component, is applied between the drum (earth or ground) and the donor roll, the direct current average of which is negative, whereby the donor roll is given a negative potential. As a result, the toner particles are repelled from the donor roll and are accordingly transported to the drum by this external driving force (i.e. the applied high voltage). The development mechanism, which has been described above, is known as "Discharged Area Development" using negative charge and a negative voltage. Of course, the same development mechanism with reversed polarities can be used, if desired. Furthermore, the opposite type of development mechanism, known as "Charged Area Development", can be used, if desired. In the "Charged Area Development" the highly charged areas and the toner have opposite polarities, such that toner is deposited on the highly charged areas, while it is not deposited on the low- or non-charged areas. Of course this development mechanism can be used with either negatively charged toner in combination with highly charged areas of positive polarity and a suitable externally applied voltage, or with positively charged toner in combination with highly charged areas of negative polarity and a corresponding suitable externally applied voltage. The mask is lifted in one additional electrostatic step from the printer drum to the glass plate, where the mask finally gets its entire extension. The glass plate, which as mentioned above, can consist of quartz glass if desired, and the mask carried thereby are transferred into the build chamber that is at a temperature of about 185° C., and are exposed to IR radiation. The radiation that directly hits the IR absorbing additives in the toner is absorbed, while the radiation that does not hit will continue into the mask and hit the additives having a very high refractive index, whereby the radiation path in the material will increase and thereby also increase the chances of being absorbed in the material. In this manner, the mask also acts to maintain the heat balance in the build chamber.

After the exposure through the mask consisting of toner particles, the glass plate is returned to a position outside the build chamber and the toner particles are scraped off and at least 50% thereof are recirculated, since any toner particles that no longer have the correct physical properties, such as the correct size and shape, have to be separated. If a developer is used, the toner composition is mixed with the carrier particles before reuse.

One exemplary embodiment of a toner composition may consist of (all percentages are in % per weight):
PFA: 93.1% (DuPont)
TiO2: 4.9% (DuPont)
carbon black: 2.0% (Cabot Corporation; the particular product may be "Monarch 120" (registered trademark by Cabot Corp.))

An exemplary particle size distribution of the PFA may be: d10~10-15 um; d50~29-38 um; d90~52-68 um (the ranges reflect variability in measurement results related to slightly different preparations of the sample for the purposes of particle size measurement).

An exemplary embodiment of a developer may consist of:
said toner composition: 20%
a carrier: 80% (80 micrometer Manganese-Ferrite carrier from the company Powder Tech, with acrylic coating)
An obtained toner charge-to-mass ratio in the developer mix may be: −2.0 micro-Coulomb per gram to −4.5 micro-Coulomb per gram Another exemplary embodiment of a developer may consist of:
said toner composition: 20%
a carrier: 80% (80 micrometer Manganese-Ferrite carrier from the company Powder Tech, with acryl styrene coating)
An obtained toner charge-to-mass ratio in the developer mix may be again: −2.0 micro-Coulomb per gram to −4.5 micro-Coulomb per gram Although the toner composition and the developer have been described above with reference to the use for forming a masking pattern in connection with the production of volume bodies from a large number of mutually connected layers of a particulate material, the toner composition and the developer according to the invention can of course also be used in other applications in which it is desired to irradiate the surface of a substrate through a masking pattern.

The invention claimed is:

1. A toner composition adapted to be used in forming a masking pattern in a method of building up a three-dimensional body from a large number of mutually connected layers of powder particles that are bonded to each other using radiant heat, wherein
the toner composition consists of powder particles and at least a majority of the powder particles are made of a polymer material, a non-abrasive ceramic material selected from glass and talcum powder and/or a non-abrasive metal material, all of the powder particles having a Mohs-hardness of 8 or less,
the entire toner composition is able to withstand a temperature of at least 200° C. without the powder particles sticking together, and
the toner composition has the property that it absorbs and reflects incident electromagnetic radiation that impinges essentially perpendicularly onto the masking pattern wherein a toner layer having a thickness that corresponds to three particle mono-layers of powder particles has a radiation transmission of not more than 30%.

2. The toner composition according to claim 1, wherein all of the powder particles have a glass transition temperature higher than 200° C.

3. The toner composition according to claim 2, wherein the material of the powder particles is chosen such that the powder particles do not mechanically deform at temperatures greater than 200° C.

4. The toner composition according to claim 1, wherein a toner layer having a thickness that corresponds to three particle mono-layers of the powder particles will result in a radiation transmission of not more than 20%.

5. The toner composition according to claim 1, wherein the polymer material is chosen from a group that consists of fluoropolymers, polyimide (PI), polyethersulfone (PES) and polyetheretherketone (PEEK).

6. The toner composition according to claim 1, wherein the non-abrasive metal material is chosen from gold, gold alloys, titanium, titanium alloys and stainless steel.

7. The toner composition according to claim 2, wherein the powder particles carry, internally and/or externally, at least one of an absorbing material and a reflecting material.

8. The toner composition according to claim 7, wherein the absorbing material consists of carbon black in an amount of 0.5-5% by weight.

9. The toner composition according to claim 7, wherein the reflecting material consists of titanium dioxide in an amount of 4-10% by weight.

10. The toner composition according to claim 7, further comprising silicon dioxide in an amount of 0.1-1% by weight.

11. The toner composition according to claim 1, wherein the powder particles have an average diameter d50 in the range of 30-35 μm.

12. The toner composition according to claim 1, wherein a major part of the powder particles has an average diameter d50 between 4 μm and 20 μm.

13. The toner composition according to claim 12, wherein the powder particles have an average diameter d50 of about 10-15 μm.

14. A developer comprising a mixture of carrier particles and the toner composition according to claim 1.

15. The developer according to claim 14, wherein the carrier particles comprise magnetically-susceptible ferrite particles.

16. The developer according to claim 14, wherein the carrier particles have a diameter that is 2-10 times larger than the diameter of the powder particles of the toner composition.

17. The developer according to claim 16, wherein the toner particles make up 5-30% by weight of the toner composition-carrier mixture.

18. A method for producing a volume body of a large number of mutually connected layers of powder particles that are bonded to each other using radiant heat, wherein the method comprises:
forming a masking pattern using a toner composition according to claim 1, the masking pattern preventing certain surface regions of an uppermost layer of a particulate material disposed adjacent to the masking pattern from being sintered or melted by the radiant heat,
removing the masking pattern, and
recirculating at least 50% of the removed toner composition.

19. A toner composition consisting essentially of powder particles made of a polymer material, a non-abrasive ceramic material selected from glass and talcum powder and/or a non-abrasive metal material,
wherein all of the powder particles have a Mohs-hardness of 8 or less, the entire toner composition is capable of withstanding a temperature of at least 200° C. without the powder particles adhering together, and a layer of the toner composition having a thickness of 100 microns transmits less than 25% of infra-red radiation through it.

20. A toner composition according to claim 19, wherein the toner composition at least substantially comprises perfluoroalkoxy polymer (PFA) having a glass transition temperature of more than 200° C. and the toner composition further comprises 0.5-5% by weight of an infra-red absorbing material and 4-10% by weight of an infra-red reflecting material.

21. A toner composition according to claim 20, wherein the infra-red absorbing material comprises carbon black, the infra-red reflecting material comprises titanium dioxide and the powder particles have an average diameter d50 of about 29-38 microns.

22. A developer comprising:
about 5-30% by total weight of the toner composition of claim 21 and about 70-95% by total weight of ferrite particles having a diameter that is 2-10 times larger than the diameter of the powder particles of the toner composition.

23. A method for forming a three-dimensional body from bonded-together layers of particulate material, the method comprising:

(a) forming a substantially non-transparent masking pattern on a masking device, the masking pattern comprising the toner composition of claim 21,
(b) disposing the masking device adjacent to an uppermost layer of the particulate material,
(c) applying infra red radiation to the masking device, whereby a portion of the uppermost layer of the particulate material that is not masked by the masking pattern is melt-bonded together,
(d) removing the masking pattern from the masking device, and
(e) reusing at least 50% of the toner composition of the removed masking pattern in a repetition of steps (a)-(d).

24. The toner composition according to claim 3, wherein the toner composition at least substantially comprises perfluoroalkoxy polymer (PFA) and further comprises 0.5-5% by weight of carbon black and 4-10% by weight of titanium dioxide.

* * * * *

UNITED STATES PATENT AND TRADEMARK OFFICE
CERTIFICATE OF CORRECTION

| | | |
|---|---|---|
| PATENT NO. | : 8,399,167 B2 | |
| APPLICATION NO. | : 12/675098 | |
| DATED | : March 19, 2013 | |
| INVENTOR(S) | : David Hermann et al. | |

It is certified that error appears in the above-identified patent and that said Letters Patent is hereby corrected as shown below:

On the Title page, the following priority information should appear after "Prior Publication Data":

-- Related U.S. Application Data

(60)   Provisional Application No. 60/968,118, filed on August 27, 2007. --

Signed and Sealed this
Second Day of July, 2013

Teresa Stanek Rea
*Acting Director of the United States Patent and Trademark Office*